UNITED STATES PATENT OFFICE 2,138,090

TREATMENT OF TITANIUM ORES

Oscar T. Coffelt, Jackson, Mich., assignor, by mesne assignments, to E. I. du Pont de Nemours and Company, a corporation of Delaware No Drawing. Application January 23, 1935, Serial No. 3,142

3 Claims. (Cl. 23—117)

This invention relates to the treatment of ores with an acid to form chemical products, and where water is one product of the chemical reaction between the ore and the acid. The invention has value in the treatment of certain oxides or oxygen containing materials that require the acid concentration in relation to water to be above definite minimum limits to produce practical results or optimum conditions. The special values in the invention are found in the end product as, extended chemical action, more complete chemical reactions, more concentrated product, a more complete utilization of materials and energy, etc. The invention has special economic value in its application to titanium ores. The application of the principles of the invention are herein made with ilmenite, a titanium ore, the final recovery of certain titanium products being an object in view. It will be seen on full disclosure that there might be other materials to which the principles of invention can be applied.

In the earlier methods of treating ilmenite ore, concentrated sulfuric acid 93% to 95% was used to produce soluble products from the ore. In my Letters Patent #1,357,690 (Nov. 2, 1920) I claimed sulfuric acid of approximately 81.5% acid strength as an improvement in the method of treating the ore, that acid strengths of substantially higher or lower could be used with less advantage.

The procedure in those methods consisted in steps of mixing the ore and the acid and applying heat to the completion of reaction.

In order that my present invention may be more fully understood, I will explain the reactions and procedures in Patent #1,357,690 as pertaining to the initial treatment of the ore and as experienced in the practical application of the claims, adding some thoughts that were not fully understood at the time of the invention.

The ilmenite ore and 95% sulfuric acid were placed in a rectangular steel tank. Water was added in quantities calculated to produce an acid concentration of 81.5%. The advantages of a higher temperature were obtained. Heat was applied to one side of the tank, and the materials stirred. As the acid acts on the ore, the products go into solution, as can be noticed by the gradual thickening of the solution as the temperature rises. Finally the liquids will hold no more of the products, and at this point titanium and iron sulfates begin to crystallize in the form of a salt. This crystallization causes a lowering of the boiling point of the liquids. Copious fumes containing water vapor and sulphur trioxide are given off with the vigorous boiling. The liquids in the mass have a viscous syrupy appearance. The mass is full of gas bubbles and, due to these, sometimes rises to twice its volume. In the end the chemical reaction stops, gases are no longer given off, and, due to the further crystallization, there is a drop in temperature that causes the mass to become solid. The enclosed gas and vapor bubbles are trapped in the mass and while they may diminish in size, the end result is a solid that has a very porous and cellular structure. Water is added directly to the hot mass in a quantity to make the desired dilution. The product dissolves quickly. The liquid is removed from the tank as it begins to take on a violet color due to the action of the acid on the tank, and the chemical reduction of titanium valence.

What was not understood at the time of preparation of the patent letters was; that the crystallization of the salts carried with them water in the combined state and this increased the concentration of the remaining acid to such an extent and manner that the chemical action was carried farther than that which could be accomplished by heat if the water were not so removed. Further that the increasing amount of water formed by the chemical action of acid on the ore, and the decreasing amount of uncombined acid in the mass, had a marked decreasing effect on the chemical action as approaching a point of ineffectiveness in its action on the ore.

It can be seen by theory that if molecular quantities of ore and acid were used and the chemical action carried to completion with no losses by evaporation etc. for every molecule of acid used there would be one molecule of water formed and in the end the only uncombined liquids would be water.

Now if 40% sulfuric acid is not effective in its action on an ore such as ilmenite it is easy to see that by the old methods this concentration would be reached long before the full use of the acid was accomplished. Similarly other concentrations can be calculated while taking into account water evaporated and water taken out of the reaction as combined water.

My present invention is based on the control of the dilution caused by the chemical formation of water.

In the practice of my invention I can have as a starting acid concentration any practical concentration as may have been used in any of the known methods, it being understood the degree of fineness of the ore has an advantage in using minimum quantities and that large quantities of unground ore serve a similar purpose. With a finely ground ore I have had good results in making an initial digestion using an excess of ore and an acid concentration below 70%; with the same ore and 95% acid, a practical reaction was made. These masses of digested or partially digested ilmenite contain in addition to the water added, the water of chemical formation, less the quantity that has been evaporated. To such masses I can apply my invention and offer the following examples for clearness of understanding.

Example 1

In a beaker 118 grams of 95% sulfuric acid was mixed with 27 cc. of water (the mixture by calculation is approximately 76% acid strength). To this, 50 grams of ground ilmenite was added and stirred while heating. The characteristic chemical reaction ensued and in the end the final product was a limpid mass of fluids and solids.

To this product was added 235 grams of 95% sulfuric acid and 100 grams of ilmenite ore. The whole was again stirred and heated to obtain a chemical reaction. The reaction was characteristically the same as the one previously described. Copious fumes were given off and in the end a solid of porous and cellular structure resulted. The solid dissolved readily and after being freed from the unattacked ore was analyzed for iron, total sulfates and titanium.

Titanium was found in the solution at a ratio to related sulfate of less than one to two.

Example 2

In a beaker 118 grams of 95% sulfuric acid was mixed with 30 cc. of water. To this 300 grams of ground ilmenite were added and while stirring was heated to produce a chemical reaction. 352 grams of 95% sulfuric acid were added slowly through a stop-cock at an estimated rate at which the reactions were taking place. The mass remained semi-liquid throughout the addition. The whole was further heated and the characteristic final crystallization took place. The end result was a solid of porous and cellular structure. The solids were dissolved, freed from the remaining ore and analyzed.

Titanium was found in the sulfate solution at a ratio to the related sulfates of slightly more than one to two.

Example 3

The procedure in Example Number 2 was repeated except 236 grams of 95% sulfuric acid were added in the second step and this was followed by 92 grams of 20% fuming sulfuric acid. The final product was a hard solid of porous cellular structure, and dissolved slowly in water. The solution was freed from the remaining ore and analyzed.

Titanium was found in the sulfate solution at a ratio to the related sulfates of 1.21 to 2.

Further evaporation of water by mechanical arrangements may or may not assist in obtaining the desired final product, as it has been my experience to find that high acid concentration under some conditions retards chemical action. However such mechanical arrangements are not prohibited.

The invention can be adapted for low or high pressure equipment and can be arranged to work continuously or by batch methods. The end product can be controlled by the choice of the final acid concentration in the digesting mass.

In my claims I use the terms "more concentrated form of the acid", this is meant in comparison to the acid concentration in the liquids of the treated mass whether they be visible or invisible.

I am aware of the abundance of chemical knowledge in the various arts and wish that the following claims be restricted to that which is new and to that end be construed as broadly as is permissible.

What I claim is:

1. A process for attacking a titaniferous ore with acid, comprising initially adding sulfuric acid of substantially 76% strength to said ore and heating to effect interaction therebetween, continuing the reaction until the ore-acid mixture becomes reduced to a substantially semi-liquid condition, completing said reaction by adding further amounts of sulfuric acid but at a concentration of at least 95% strength and continuing the reaction while maintaining the ore-acid mixture at an elevated temperature until said ore-acid liquid mass becomes reduced to a porous, solid state.

2. A process for attacking a titaniferous ore with acid, comprising adding sulfuric acid of substantially 76% strength to said ore and heating to effect interaction therebetween, continuing the reaction until the ore-acid mixture becomes reduced to a substantially semi-liquid condition, completing said reaction by adding further amounts of sulfuric acid but at substantially 95% strength and heating to continue the reaction until said ore-acid liquid mass becomes reduced to a porous, solid state.

3. A process for attacking a titaniferous ore with acid, comprising initially adding sulfuric acid of substantially 76% concentration to an excess of said ore and heating to effect interaction therebetween, continuing the reaction until the ore-acid mixture becomes reduced to a substantially semi-liquid condition, completing said reaction by adding further amounts of an excess of ore and sulfuric acid but at a concentration of at least 95%, and heating to continue the reaction until said ore-acid liquid mass becomes reduced to a porous, solid state.

OSCAR T. COFFELT.